(12) United States Patent
Williamson

(10) Patent No.: US 7,263,266 B2
(45) Date of Patent: Aug. 28, 2007

(54) PRECISION FIBER ATTACHMENT

(75) Inventor: Steven L. Williamson, Ann Arbor, MI (US)

(73) Assignee: Picometrix, LLC, Ann Arbor, MI (US)

( * ) Notice: Subject to any disclaimer, the term of this patent is extended or adjusted under 35 U.S.C. 154(b) by 0 days.

(21) Appl. No.: 10/538,248

(22) PCT Filed: Dec. 10, 2003

(86) PCT No.: PCT/US03/39553

§ 371 (c)(1),
(2), (4) Date: Jun. 9, 2005

(87) PCT Pub. No.: WO2004/053537

PCT Pub. Date: Jun. 24, 2004

(65) Prior Publication Data

US 2006/0056788 A1   Mar. 16, 2006

Related U.S. Application Data

(60) Provisional application No. 60/432,332, filed on Dec. 10, 2002.

(51) Int. Cl.
*G02B 6/00* (2006.01)
(52) U.S. Cl. .................... 385/137; 385/88; 385/90
(58) Field of Classification Search .......... 385/88, 385/90, 137
See application file for complete search history.

(56) References Cited

U.S. PATENT DOCUMENTS

| | | | |
|---|---|---|---|
| 4,722,586 A | 2/1988 | Dodson et al. | |
| 5,307,434 A | 4/1994 | Blonder et al. | |
| 5,469,456 A | 11/1995 | Rogers et al. | |
| 6,574,411 B2 * | 6/2003 | Seguin | 385/137 |

FOREIGN PATENT DOCUMENTS

| WO | WO01/53862 A1 | 7/2001 |
|---|---|---|
| WO | WO03/023460 A2 | 3/2003 |

* cited by examiner

*Primary Examiner*—Jennifer Doan
(74) *Attorney, Agent, or Firm*—Brinks Hofer Gilson & Lione

(57) ABSTRACT

This invention is directed to a fiber attachment including a hot pad and solder glass that attaches an optical fiber to the hot pad. The attached is formed by positioning the optical fiber over the hot pad and aligning the optical fiber. The optical fiber is then raised and solder glass preforms are positioned on the hot pad. Heat is applied to the glass preforms such that they melt. Once the preforms are melted, the optical fiber is lowered into the molten solder glass. The current is then removed and the solder glass solidifies as it cools to form an attachment between the optical fiber and the hot pad.

24 Claims, 4 Drawing Sheets

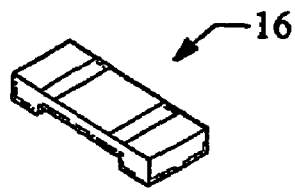
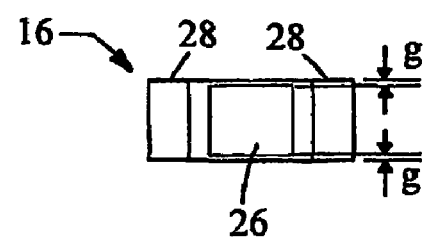
FIG. 2A
FIG. 2B
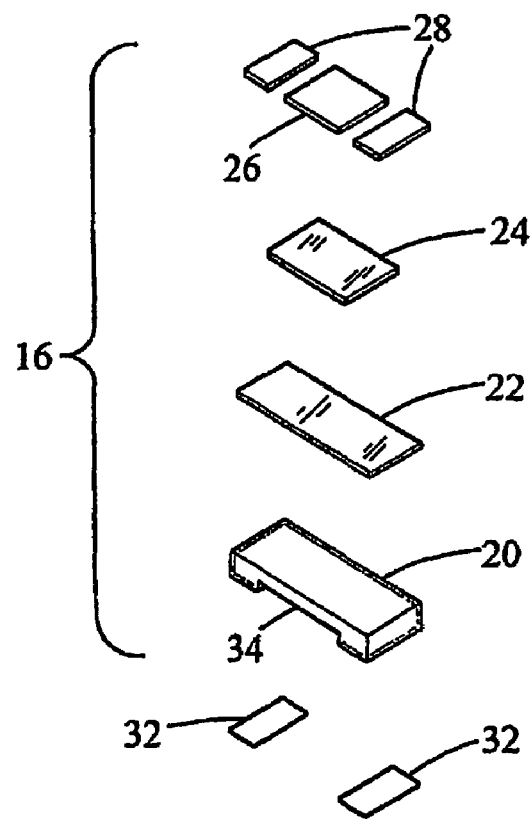
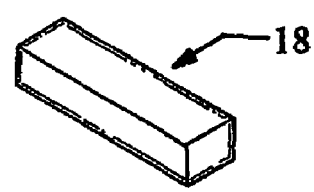
Fig. 2C
FIG. 3

PRECISION FIBER ATTACHMENT

RELATED APPLICATION

This application claims the benefit of U.S. Provisional Application No. 60/432,332, filed Dec. 10, 2002, the entire contents of which are incorporated herein by reference.

BACKGROUND

This invention relates to the precision attachment of an optical fiber.

The attachment of optical fibers with micrometer positioning accuracy is critical in the optical component industry. Positional, as well as angular and rotational accuracy, and the ability to hold the set position throughout Telcordia qualification of the part, are both challenging and critical in the packaging of most high-speed transmitter and receiver communication components, as well as packaging of fibers to lasers, modulators, or other optical components. With optical fibers and photodiode active areas each having diameters of the order of ten micrometers, fiber attach with single-micrometer positioning tolerance is the norm.

There are two basic alignment approaches available: passive alignment and active alignment. Passive alignment involves the precise placement of all optical components prior to the introduction of the optical fiber. One of those components is a fiber holder, often in the form of a V-groove formed from silicon. This holder is also precisely positioned with respect to the photodiode to which the fiber is to be coupled. After all of the components are attached (often using automated pick and place machines), the fiber is then placed in the pre-aligned fiber holder and, without further need for alignment, the fiber is cemented into place. If the components are placed correctly, the light emitted from the end of the fiber will be directed onto the photodiode. This process often times can use epoxy adhesives for the attachment. The disadvantage of the passive fiber attachment approach is that it provides only coarse, ~10-micrometer positioning accuracy. This accuracy is adequate for slower, ($\leqq$2.5 Gbs) photoreceivers, but not so for the higher speed, 10-GBs and 40-GBs photoreceivers.

For higher speed photoreceivers, in which the detector diameter can shrink to less than 10 micrometers, active alignment of the fiber to the detector is desirable. Active alignment is accomplished by introducing a feedback loop between the detector's electrical output and the positioning stage that is holding the optical fiber. For active alignment applications, there is no pre-positioned fiber holder in the assembly. Instead, the fiber is free to move over some small range until the detected signal (usually in the form of electrical current) from the photodiode reaches the satisfactory value and the fiber is then locked (attached) in place. The feedback loop often times is simply the technician moving the XYZ positioning stage until he/she maximizes the current flow from the photodiode. With this approach, it is possible to align an optical fiber with micrometer, or even submicrometer accuracy.

It is desirable that a fiber attachment process be chosen that is easy to control and assures that the fiber will stay precisely positioned throughout the life of the product. This latter point can be challenging, since these kinds of components are subjected to large temperature swings as well as shock and vibration. Epoxies and low-temperature melting solders are not satisfactory, since they creep by as much as a few micrometers over time and temperature variations. For these reasons, only a few processes are in use today in precision fiber attach of high-speed photoreceivers and transmitters. The primary approach used involves a combination of soldering and welding of the optical fiber to a pedestal that is mounted within the photoreceiver module. This approach can provide the requisite positioning accuracy and can hold to this accuracy over the entire suite of Telcordia tests. However, it requires that the fiber be treated (coated) with a Ni/Au jacket near its end, in order to facilitate solder attachment to the pedestal. This treatment of metal to the optical fiber can add considerable expense to the fiber component. Until recently this expense seemed unavoidable, since the metalized fiber was needed in all cases to hermetically seal the fiber to the receiver module during the final packaging steps. Recently, there has been a push towards lowering manufacturing costs for slower photoreceivers (those that are passively aligned) by eliminating the need for metalized fiber and instead hermetically sealing the fiber to the module using a novel material referred to as low-temperature solder glass. Low-temperature solder glasses are materials that have all the attributes of glass (i.e. their hardness, resistance to creep, temperature cyclability, and hermeticity) but they melt around 300° C. For hermetic sealing applications, a doughnut-shaped solder glass preform is inserted into the Kovar fiber tube, along with the optical fiber (that passes through the doughnut hole). Once the module is completely assembled, heat is imparted to the Kovar fiber tube, often from an inductive-type heater. The solder glass preform then melts, wets, and seals the volume between the loose-fitting optical fiber and the inside walls of the Kovar tube. This is a glass-to-metal seal and is impervious to moisture.

BRIEF SUMMARY OF THE INVENTION

This invention is directed, in general, to the application of low-temperature solder glass for fiber attachment within the module itself. The fiber attachment allows for the use of a non-metalized fiber in optoelectronics, such as high performance photoreceivers, where alignment tolerances are stringent. The fiber attachment includes a hot pad and solder glass that couples or attaches the optical fiber to the hot pad.

The fiber attachment may be formed by positioning the optical fiber over the hot pad and aligning the optical fiber, for example, relative to an optoelectronic component. The optical fiber is then raised and solder glass preforms are positioned on the hot pad. The glass preforms are melted, for example, by applying current through the hot pad. Once the preforms are melted, the optical fiber is lowered into the molten solder glass. The current is then removed and the solder glass solidifies as it cools to form an attachment between the optical fiber and the hot pad. Alternatively, the solder glass may be melted by heating the solder glass using a laser or inductive type heater.

The solder glass can be obtained as preforms to replace solder seals at a fraction of the cost with improved resistance to fatigue, creep, and corrosion.

Other features and advantages of the invention will be apparent from the following drawings, detailed description, and claims.

BRIEF DESCRIPTION OF THE DRAWINGS

FIG. 2A is a perspective view off a hot pad for the fiber attachment.

FIG. 2B is a top view of the hot pad.

FIG. 2C is an expanded view of the hot pad.

FIG. 3 is a perspective view of a solder glass preform for the fiber attachment.

DETAILED DESCRIPTION

Figure 1A:
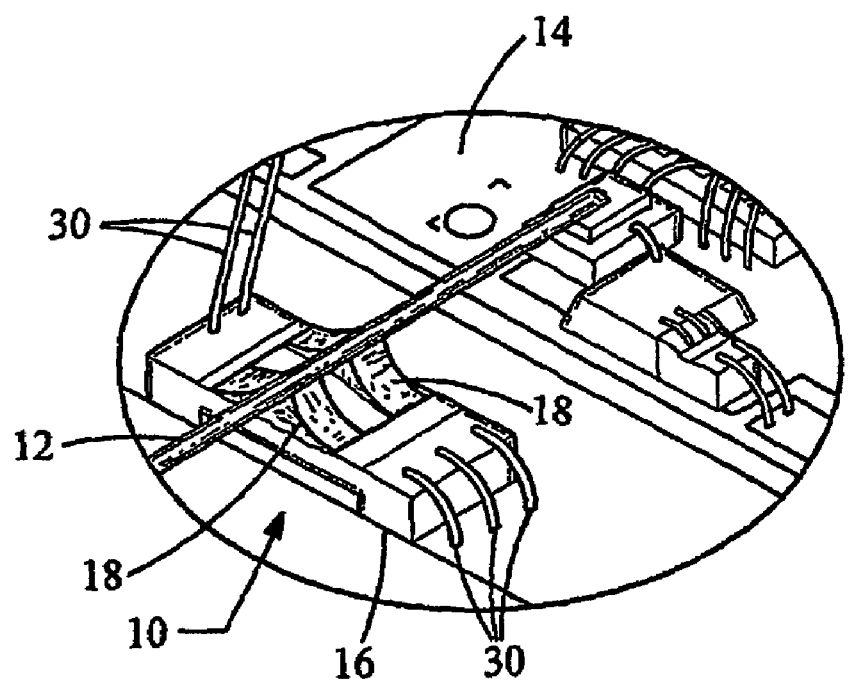
FIG. 1A is a perspective view of a fiber attachment for an optoelectronic device in accordance with the invention.
Figure 1B:
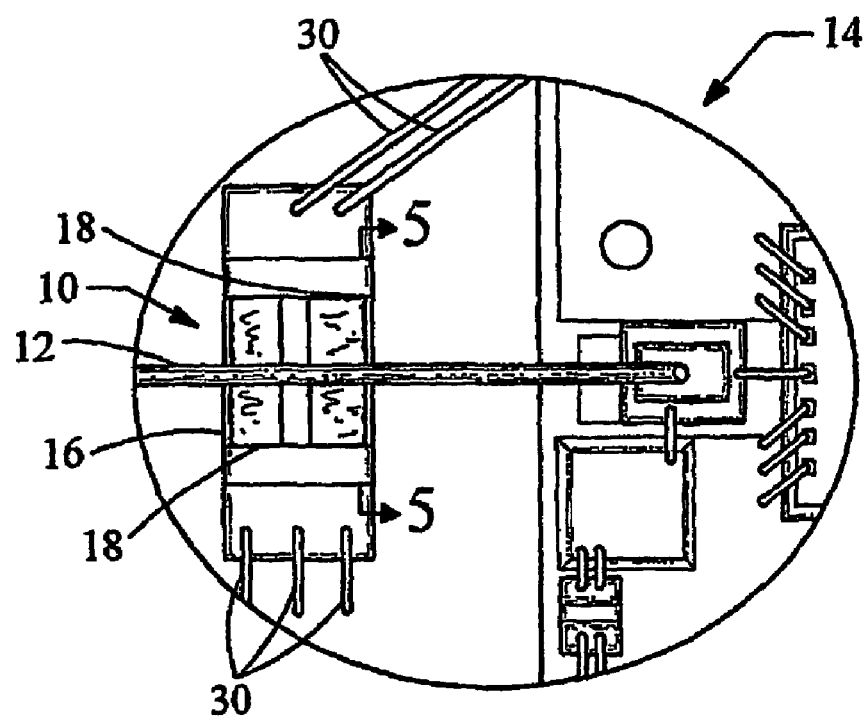
FIG. 1B is a top view of the fiber attachment for the optoelectronic device.

In accordance with an embodiment of the invention, FIGS. 1A and 1B illustrate a fiber attachment 10 which supports an optical fiber 12 for a optoelectronic component 14 within a module. The fiber attachment 10 can be used to secure an aligned fiber to a photodiode, laser or other optoelectronic device, including terahertz transceivers, transmitters and receivers. Further, the fiber attachment 10 can be used to secure the alignment of one fiber to another or any other optical device.

Figure 4A:
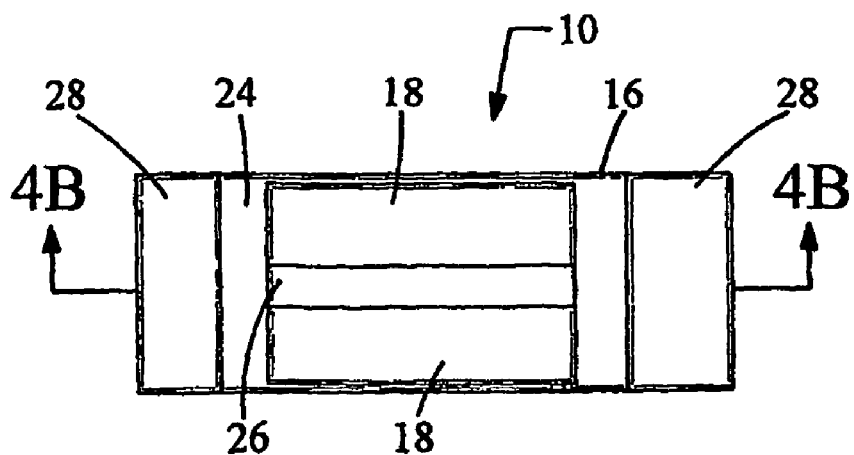
FIG. 4A is a top view of the fiber attachment before the solder glass is melted.
Figure 4B:
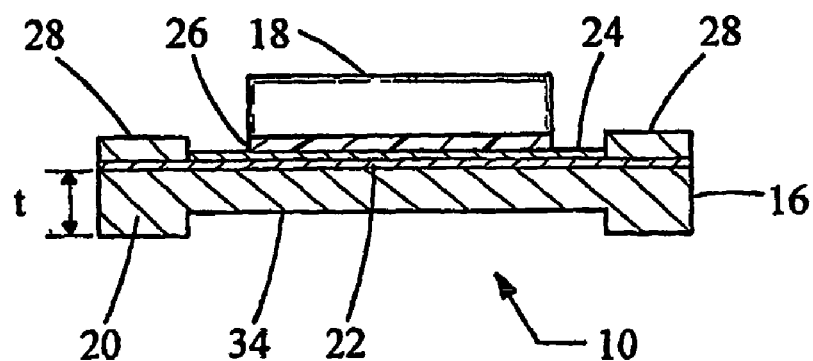
FIG. 4B is a side view of the fiber attachment shown in FIG. 4A along the line 4B-4B.

Referring to FIGS. 2A, 2B, 2C, and 3, the fiber attachment 10 includes a heating element or hot pad 16 and solder glass 18. The hot pad 16 includes a substrate 20, a resistive element or resistor 22 positioned on top of the substrate 20, a dielectric 24 positioned on top of the resistor 22, a center pad 26 positioned on top of the dielectric 24, and a pair of side pads 28 positioned on top of the resistor 22 and on either side of the dielectric 24. The bottom surface of the hot pad 16 may be provided with optional pads 32 to facilitate soldering of the hot pad 16 to the module floor, for example, with conventional solder bonding such as 80Au/20Sn. The solder glass 18 is initially placed on top of the center pad 26 as a rectangular preform as illustrated in FIGS. 4A and 4B.

Figure 5:
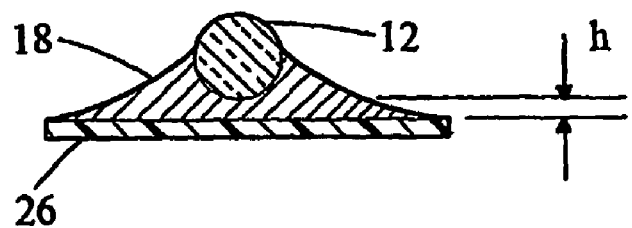
FIG. 5 is a view of the fiber attachment to the hot pad with solder glass along the line 5-5 of FIG. 1B.

Accordingly, the hot pad 16 is constructed as a microfabricated-resistive heater that is brought to temperature by passing current through the resistor 22 to heat the solder glass 18. Thus, the center pad 26 is in the form of a sheet and serves as the hot plate over which the solder glass is melted. When heated, the solder glass preforms melt and wet to the center pad 26 and to the optical fiber 12 to form an attachment between the optical fiber 12 and the hot pad 16 as shown in FIG. 5. In some implementations, the fiber 12 is attached to the hot pad 16 by the solder glass 18 at a height, h, of about a few tens of micrometers above the top surface of the center conductor 26. Alternatively, the height, h, can be as much as millimeter or more.

The side pads 28 on either ends of the resistor 22 are the electrical contact points for the hot pad 16. The dielectric 24 electrically isolates the side pads 28 from the center pad 26, and the center pad 26 conducts heat from the resistor 22 to the solder glass preforms 18. The electrical connection to the side pads 26 can be made via electrical probes or with wire bonds that are connected to the module's electrical feedthroughs. Typically, the side pads 26 are wire bonded with wires 30 from the side pads 26 to terminals located on the module wall. In this way, the module can be mounted in a fiber alignment fixture and powered up as normal, without introducing external probes to the inside of the module during the alignment procedure.

Note that with conventional solders, such as Pb/Sn solders, used for attaching to Au-metalized fibers, the melting temperature of the solder can be as low as 200° C. At this temperature, the components within the module indeed increase in temperature, but still operate property. Thus, the operator can actively align the fiber while the receiver module is fully operational.

Typically, the solder glass preforms 18 melt at about 300° C. or higher. However, these temperatures may compromise the receiver's performance and alignment. Moreover, transferring heat away from the hot pad surface not only necessitates higher electrical power to maintain the melting temperature of the solder glass but it also unnecessarily heats the module and surrounding components. Thus, the substrate 20 is provided with an optional undercutting 34, which serves to better confine the heat to the top surface of the hot pad 16, that is, near the resistor 22, where it is needed to melt the solder glass. The undercutting 34 can be formed by sawing away the excess substrate 20. Another way for confining heat to the hot pad 16 is to slot the module floor over which the hot pad straddles.

In particular implementations, the substrate is made from alumina ($AL_2O_3$) with a grain size in the range between about 4 to 7 µm and a surface finish in the range between about 20 to 36 µm. The depth of the undercutting 34 can be about half the thickness, t, of the substrate 20. The resistor 22 can be made from TaN with a resistance of about 100 to 150 ohms. The dielectric 24 can be made from polyimide with a thickness of about 2 to 3 µm. The center pad 26, the side pads 28, and/or the bottom pads 32 can be gold pads, or any other suitable material. In certain embodiments, the side pads 28 are about 1 mm long and about 0.5 mm wide and are positioned about 0.25 mm from either side of the center pad 26. There may be a gap, g, of about 0.05 mm between the edges of the center pad 26 and the edges of the substrate 20.

As shown in FIGS. 1A and 1B, the optical fiber 12 is perpendicular to the longitudinal extent of the solder glass 18. Alternatively, the optical fiber 12 can be placed in the region between the solder glass 18 preforms so that the preforms flank the optical fiber 12. In some embodiments, the glass preforms have a partial doughnut shape with the fiber 12 positioned within the hole of the preform.

The glass preforms 18 may be glass powders that are pressed into a variety of sizes and shapes and sintered without organic residues resulting in no outgassing during the sealing process. For example, the glass preforms may be preforms (such as model no. DM2700PF) available from Diemat, Inc., located in Byfield, Mass. With these preforms, hermetic seals with the optical fiber 12 in air can be achieved at temperatures at about 320° C. within a few seconds.

Figure 6:
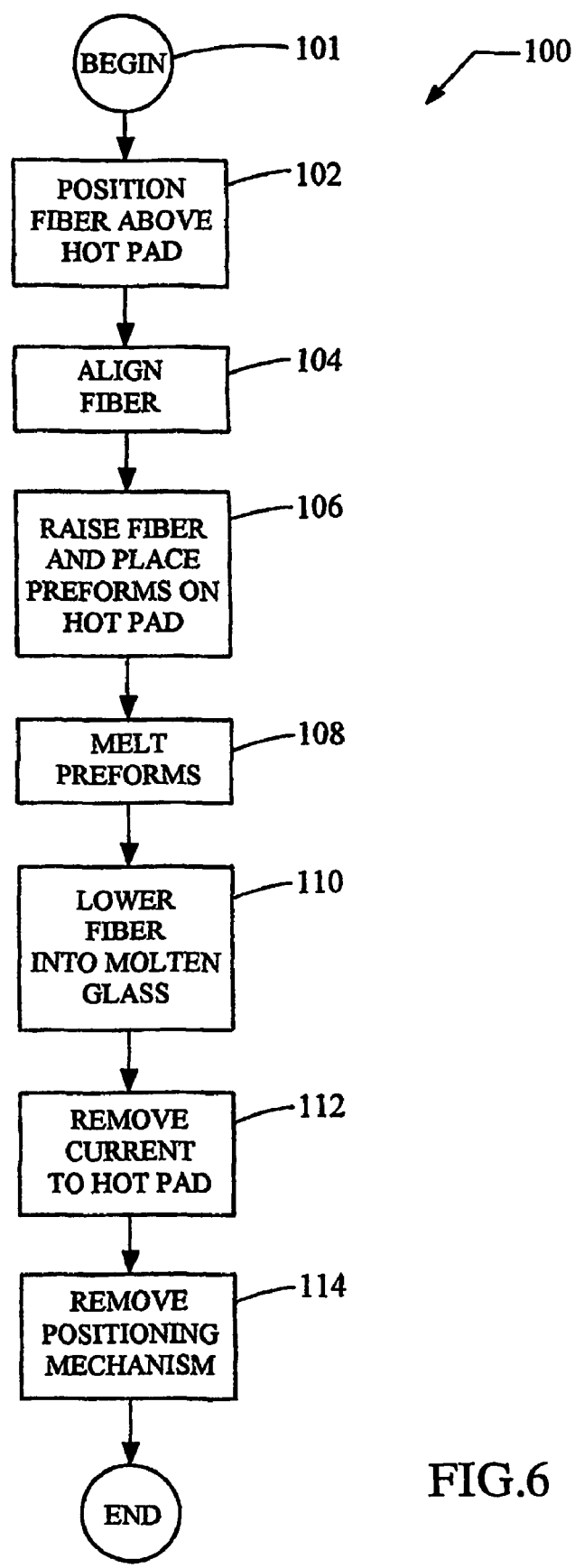
FIG. 6 is a flow diagram of a sequence of steps for attaching a fiber to a hot pad with melted solder glass in accordance with the invention.

Referring now to FIG. 6, there is shown a process 100 for forming the attachment 10 to bond the fiber 12 to the hot pad 16, and hence to couple the fiber 12 to the optoelectronic component 14. After the process 100 initializes in step 101, in step 102, the optical fiber 12 is positioned over the optical component 14. For example, tweezers may be used that hold the fiber 12 at a location between the hot pad 16 and the back wall of the module in which the components reside. The fiber 12 can be held using micrometer-positioned tweezers or other means to grip the fiber and align it until the soldering process is completed. The solder glass can be used with either actively- or passively-aligned fiber positioning applications. The preferred location for holding the fiber with tweezers is behind the hot pad 16, that is, a distance away from the terminal end of the fiber, with the end of the fiber positioned above the hot pad 16. Griping the fiber behind the hot pad 16 assures that after the solder glass solidifies and the tweezers or gripping means are released, no movement of the fiber end can occur.

Next, in step 104, the fiber 12 is aligned to the optical component 14. For example, if the optical component 14 is a photodiode, its photocurrent can be maximized to facilitate aligning the fiber 12.

Subsequently, in step 106, the fiber 12 is raised a set distance above the optimum position, h, and the solder glass preforms 18 are placed on the hot pad 16. Once the preforms are in place, in step 108, the hot pad 16 is elevated in temperature by passing electrical current through the resistive element 22 with wire connections 30 bonded to the side pads 28.

The amount of electrical power required to melt the solder glass at about 300° C. is approximately two to three Watts, depending on the thermal conductivity of the substrate 20. If the resistance of the resistive element 22 is approximately 150 Ohms, the voltage range from when the solder glass 18 begins to soften to becoming fully melted is about 18 to 22 Volts.

As the temperature of the glass preforms approach their melting temperature, the solder glass preforms 18 begin to appear shinny and bead up. The current and, thus the temperature, is maintained at this level until the solder glass begins to wet to the center pad 26. At this time, the electrical current typically has been on for approximately less than one minute. Once the glass is fully melted and wetted to the center pad 26, in step 110, the fiber 12 is lowered back into its predetermined alignment location and into the molten solder glass at the height, h, above the top surface of the center pad 26. As the fiber 12 reaches the temperature of the solder glass 18, the fiber 12 begins to also wet to the solder glass 18. The power to the hot pad 16 may be slightly increased to sustain the melting temperature of the glass preforms 18.

In step 112, the current to the hot pad 16 is removed and the solder glass resolidifies as it cools. In step 114, the positioning mechanism such as the tweezers are removed and the fiber attachment is completed. If the solder glass shrinks during cooling, an initial predetermined offset in the position of the fiber, for example. In the direction perpendicular to the top of the hot pad, can be made to compensate for shrinkage.

All of the forgoing processes can be programmed into a controller or a programmable power meter. Unlike traditional solders, solder glass does not have an abrupt transition temperature from solid to liquid and back to solid. Instead, the glass becomes less viscous as the temperature to the hot pad is increased. This allows for a great deal of control in fiber positioning while the cool-down cycle is in progress.

Depending upon the application, the solder glass 18 can be precoated onto the hot pad 16, and the fiber 12 can have gold cladding or be bare glass. In addition to being attached to the hot pad 16, the fiber 12 can also be bonded again to provide anchoring and hermetic sealing to the module in which it is mounted.

The hot pad 16 can have a top conductive layer, such as another gold layer, above an insulating layer to help distribute the heat evenly. Or, the hot pad 16 can be a formed as a resistive layer with two electrical contacts so that the solder glass 18 bonds directly to the resistive region. The bonded fiber can be positioned directly in front of the device it is illuminating or it can be aligned via a lens such as GRIN lens. The fiber 12 can itself be tapered or lensed on its terminal end. The fiber 12 can be single-mode or multi-mode.

Other embodiments are within the scope of the following claims. For example, the solder glass can be melted by heating it using a laser or inductive type heater.

The invention claimed is:

1. A method for forming an attachment to an optical fiber, comprising:
   positioning the optical fiber over a hot pad;
   aligning the optical fiber;
   raising the optical fiber;
   positioning solder glass preforms on the hot pad;
   melting the solder glass preforms into molten solder glass;
   lowering the optical fiber into the molten solder glass; and
   cooling the solder glass to form an attachment between the optical fiber and the hot pad; and
   wherein the aligning includes aligning relative to an optoelectronic component.

2. The method of claim 1 wherein the optical fiber is grasped with tweezers to control the movement of the optical fiber.

3. The method of claim 1 wherein the melting includes passing current through the hot pad to heat the hot pad.

4. The method of claim 3 wherein the cooling includes removing the current to the hot pad.

5. The method of claim 3 wherein the voltage applied to the hot pad is in the range between about 18 to 22 volts.

6. The method of claim 1 wherein the positioning the optical fiber includes positioning the optical fiber a predetermined height above the hot pad.

7. The method of claim 6 wherein the lowering includes lowering the optical fiber to the predetermined height.

8. The method of claim 1 wherein the melting occurs when the temperature of the solder glass is above about 300° C.

9. The method of claim 8 wherein the melting occurs at about 320° C.

10. The method of claim 1 wherein the optoelectronic component is a photodiode.

11. The method of claim 10 wherein the aligning includes maximizing the photocurrent of the photodiode.

12. The method of claim 1 wherein the optoelectronic component is a terahertz transceiver, terahertz transmitter or a terahertz receiver.

13. The method of claim 1 wherein the melting includes heating the solder glass with a laser.

14. The method of claim 1 wherein the melting includes heating the solder glass with an inductive heater.

15. An optical fiber attachment comprising:
    a hot pad;
    solder glass positioned on the hot pad, the solder glass attaching the fiber to the hot pad;
    wherein the hot pad includes a substrate; and
    wherein heat is removed from one side of the substrate to concentrate heat to the opposite side of the substrate, the solder glass being positioned on the opposite side.

16. The fiber attachment of claim 15 wherein the substrate is made of alumina.

17. The fiber attachment of claim 15 wherein the one side of the substrate is provided with an undercut to concentrate heat to the opposite side of the substrate.

18. The fiber attachment of claim 15 wherein the one side straddles a slot in a module floor to which the hot pad is mounted.

19. An optical fiber attachment comprising:
    a hot pad, the hot pad includes a resistive element positioned adjacent a surface of the substrate, a center pad positioned on a surface of the resistive element that is opposite of the surface of the resistive element adjacent to the substrate, and a pair of side pads positioned on the same surface as the center pad and on either side of the center pad, the side pads being electrically connected through the resistive element and electrically isolated from the center pad; and solder glass positioned on the pad, the solder glass attaching the fiber to the hot pad.

20. The fiber attachment of claim 19 wherein the side pads and the center pad are gold pads.

21. The fiber attachment of claim 19 wherein the resistive element has a resistance in the range between about 100 to 150 ohms.

22. The fiber attachment of claim 19 wherein the solder glass is originally placed on the center pad as preforms, the preforms being melted when current is applied to the hot pad through the side pads.

23. The fiber attachment of claim 22 wherein the solder glass has a melting temperature above about 300° C.

24. The fiber attachment of claim 23 wherein the solder glass has a melting temperature of about 320° C.

* * * * *